United States Patent
Wang et al.

(10) Patent No.: US 11,214,171 B2
(45) Date of Patent: Jan. 4, 2022

(54) MIXED BATTERY PACK CONTROL

(71) Applicant: Ford Global Technologies, LLC, Dearborn, MI (US)

(72) Inventors: Xu Wang, Northville, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 16/570,655

(22) Filed: Sep. 13, 2019

(65) Prior Publication Data

US 2021/0078444 A1 Mar. 18, 2021

(51) Int. Cl.
*B60L 58/22* (2019.01)
*H02J 7/00* (2006.01)
*B60L 58/12* (2019.01)
*B60L 53/62* (2019.01)
*B60K 6/28* (2007.10)

(52) U.S. Cl.
CPC .............. *B60L 58/22* (2019.02); *B60L 53/62* (2019.02); *B60L 58/12* (2019.02); *H02J 7/0014* (2013.01); *H02J 7/0021* (2013.01); *B60K 6/28* (2013.01); *B60Y 2200/91* (2013.01); *B60Y 2200/92* (2013.01); *B60Y 2400/112* (2013.01)

(58) Field of Classification Search
CPC .......... B60L 58/22; B60L 58/12; B60L 53/62; B60L 2240/545; B60L 2240/547; B60L 2240/549; B60L 3/0046; B60L 53/80; B60L 58/13; B60L 58/21; H02J 7/0021; H02J 7/0014; B60Y 2400/112; B60Y 2200/91; B60Y 2200/92; B60K 6/28
See application file for complete search history.

(56) References Cited

U.S. PATENT DOCUMENTS

| | | | | |
|---|---|---|---|---|
| 7,626,364 | B2 * | 12/2009 | Okumura | H01M 10/44 320/137 |
| 7,785,729 | B2 * | 8/2010 | Okumura | H01M 10/425 429/49 |
| 7,998,609 | B2 | 8/2011 | Takada et al. | |
| 8,362,749 | B2 * | 1/2013 | Komori | B60L 53/12 320/136 |
| 8,836,284 | B2 * | 9/2014 | Takahashi | H01M 10/48 320/122 |
| 8,935,043 | B2 | 1/2015 | Li et al. | |
| 9,166,261 | B2 * | 10/2015 | Ibi | H01M 50/20 |
| 9,172,259 | B2 | 10/2015 | Hwang | |
| 9,236,749 | B2 * | 1/2016 | Gibbs | H02J 7/0014 |
| 10,580,224 | B2 * | 3/2020 | Kurimoto | H01M 10/425 |
| 2003/0224241 | A1 * | 12/2003 | Takada | H01M 10/425 429/52 |

(Continued)

*Primary Examiner* — Nha T Nguyen
(74) *Attorney, Agent, or Firm* — David B. Kelley; Brooks Kushman P.C.

(57) ABSTRACT

A vehicle system is provided with a battery and a controller. The battery includes a first module having a first capacity and a second module. The controller programmed to responsive to indication that the second module has been replaced by a new module with a second capacity that is greater than the first capacity for a corresponding state of charge (SOC), adjust a second SOC of the new module such that a maximum SOC value of the new module aligns with a maximum SOC value of the first module. The controller is further programmed to balance the first module and the new module separately.

11 Claims, 4 Drawing Sheets

(56) References Cited

U.S. PATENT DOCUMENTS

| | | | |
|---|---|---|---|
| 2010/0052614 A1* | 3/2010 | Mariels | H02J 7/0016 320/116 |
| 2012/0081075 A1* | 4/2012 | Skelton | H02J 7/005 320/116 |
| 2013/0200902 A1* | 8/2013 | Kurimoto | H01M 10/48 324/430 |
| 2014/0145678 A1* | 5/2014 | Hwang | H02J 7/0016 320/118 |
| 2014/0152232 A1* | 6/2014 | Johnson | H02J 7/0014 320/103 |
| 2014/0266059 A1 | 9/2014 | Li et al. | |
| 2014/0300323 A1* | 10/2014 | Gibbs | H02J 7/0014 320/116 |
| 2019/0199107 A1* | 6/2019 | Fishbune | G01R 31/367 |

* cited by examiner

MIXED BATTERY PACK CONTROL

TECHNICAL FIELD

One or more embodiments relate to a vehicle system for controlling a mixed traction battery.

BACKGROUND

Electrified vehicles, including pure electric vehicles and hybrid electric vehicles, include a high-voltage battery pack that is used for propulsion or "traction" of the vehicle, and may be referred to as a traction battery. The traction battery includes a plurality of cells. When one or more cells experience diminished performance, the entire traction battery may be replaced. However, it may be more cost efficient to replace certain cells, rather than the entire traction battery.

SUMMARY

In one embodiment, a vehicle is provided with a battery and a controller. The battery includes a first cell and a second cell. The controller is configured to determine a first state of charge (SOC) associated with the first cell and a first SOC operating range based on the first SOC over time, wherein a maximum value of the first SOC operating range corresponds to a first capacity of the first cell. The controller is further configured to, responsive to the second cell being replaced by a new cell having a second capacity that is greater than the first capacity, determine an SOC adjustment value. The controller is further configured to determine a second SOC associated with the new cell and a second operating range based on the second SOC over time, wherein the second SOC is based on the SOC adjustment value, and wherein a maximum value of the second SOC operating range is equal to the maximum value of the first SOC operating range; and balance the first cell and the new cell separately.

In another embodiment, a vehicle system is provided with a battery and a controller. The battery includes a first module having a first capacity and a second module. The controller programmed to responsive to indication that the second module has been replaced by a new module with a second capacity that is greater than the first capacity for a corresponding state of charge (SOC), adjust a second SOC of the new module such that a maximum SOC value of the new module aligns with a maximum SOC value of the first module. The controller is further programmed to balance the first module and the new module separately.

In yet another embodiment, a computer-program product embodied in a non-transitory computer readable medium that is programmed for controlling a mixed traction battery is provided. The computer-program product comprising instructions for: identifying a first cell and a second cell; determining a first state of charge (SOC) associated with the first cell and a first SOC operating range based on the first SOC over time, wherein a maximum value of the first SOC operating range corresponds to a first capacity of the first cell; and determining an SOC adjustment value in response to indication that the second cell has been replaced by a new cell having a second capacity that is greater than the first capacity. The computer-program product comprising further instructions for: determining a second SOC associated with the new cell based on the SOC adjustment value and a second operating range based on the second SOC over time, wherein a maximum value of the second SOC operating range is equal to the maximum value of the first SOC operating range; balancing the first cell; and balancing the new cell separately from the first cell.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
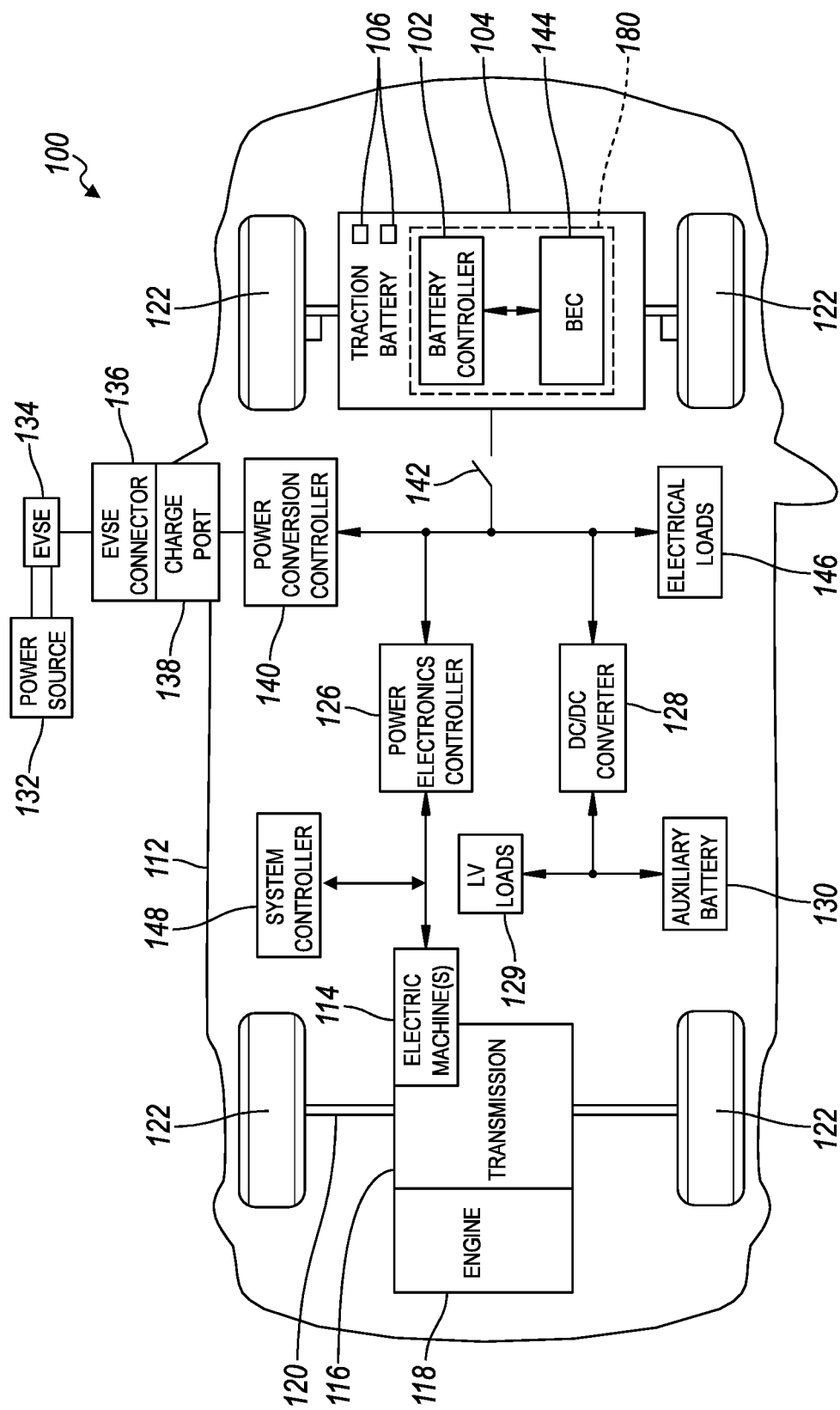
FIG. 1 is a schematic diagram of a plug-in hybrid electric vehicle (PHEV) illustrating a typical drivetrain and energy storage components with a vehicle system for controlling a mixed traction battery according to one or more embodiments.
Figure 2:
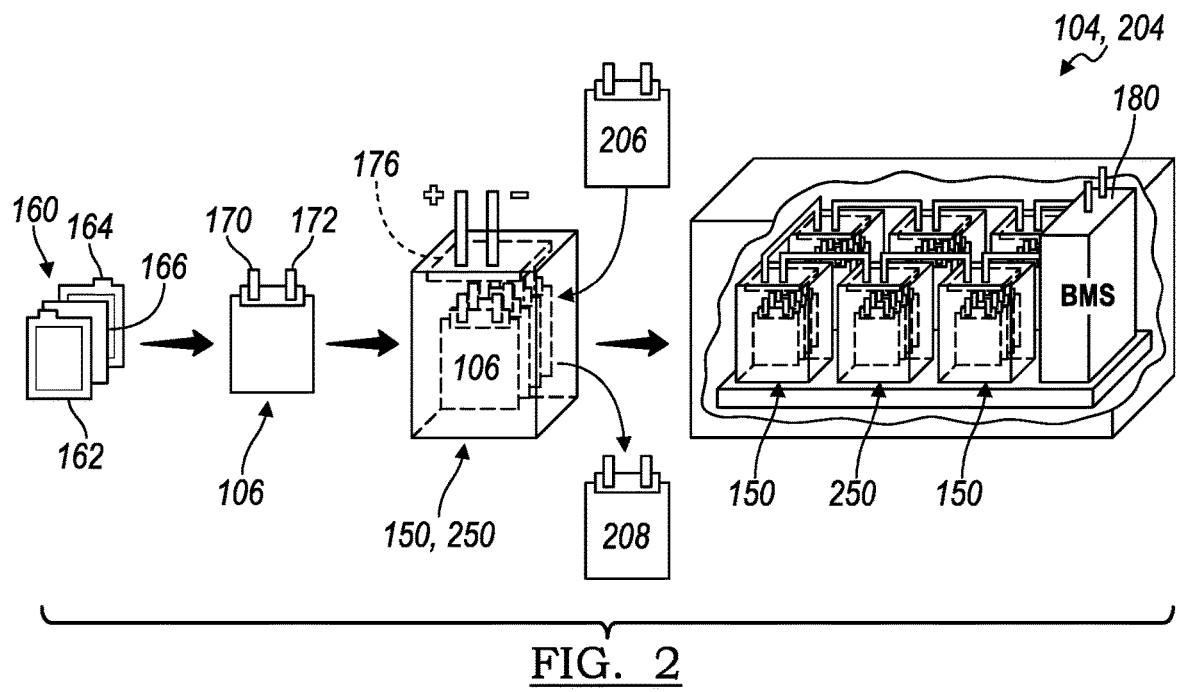
FIG. 2 is a block diagram illustrating the mixed traction battery components.

With reference to FIG. 1, a vehicle system for controlling a mixed battery pack is illustrated in accordance with one or more embodiments and generally represented by numeral 100. The vehicle system 100 includes a controller 102 and a traction battery 104. The traction battery 104 includes a plurality of cells 106 that may be replaced, individually or in groups of cells, resulting in a mixed traction battery 204 with original cells 106 and new replacement cells 206 (FIG. 2). The new cells 206 have different performance characteristics than the original cells 106 due to, among other things, battery aging. The controller 102 controls the mixed traction battery 204 to perform like a traction battery 104 having battery cells 106 with the same performance characteristics.

The vehicle system 100 is implemented in a plug-in hybrid-electric vehicle 112, according to the illustrated embodiment. The vehicle 112 includes one or more electric machines 114 that are mechanically coupled to a transmission 116 and capable of operating as a motor or as a generator. In addition, the transmission 116 is mechanically coupled to an engine 118 and to an axle 120 that is mechanically coupled to wheels 122. While FIG. 1 depicts a typical plug-in hybrid electric vehicle, the description herein is equally applicable to a pure electric vehicle or a hybrid electric vehicle of a different configuration, such as, but not limited to, a series hybrid. For a pure electric vehicle, e.g., a battery electric vehicle (BEV), the engine 118 is not present.

The electric machines 114 provide propulsion and slowing capability either while the engine 118 is operated or turned off. The electric machines 114 are capable of operating as generators and provide fuel economy benefits by recovering energy that would normally be lost as heat in a friction braking system. The electric machines 114 reduce vehicle emissions by allowing the engine 118 to operate near its most efficient speed and torque ranges. For example, the electric machines 114 may additionally impart a reaction torque against the engine 118 to convert excess engine output torque to electricity for recharging the traction battery 104 while the vehicle is propelled by the engine 118 at low demand. When the engine 118 is off, the vehicle 112 is operated in electric-only mode using the electric machines 114 as the sole source of propulsion.

The traction battery 104 stores energy that can be used by the electric machines 114. The traction battery 104 typically provides a high voltage direct current (DC) output. The traction battery 104 is electrically coupled to one or more power electronics controllers 126. The power electronics controller 126 is also electrically coupled to the electric machines 114 and provides the ability to bi-directionally transfer energy between the traction battery 104 and the electric machines 114. For example, the electric machines 114 are three-phase alternating current (AC) machines, according to one embodiment. The power electronics controller 126 converts the DC current provided by the traction battery 104 to a three-phase AC current to operate the electric machines 114. In a regenerative mode, the power electronics controller 126 converts the three-phase AC current generated by the electric machines 114 to the DC current compatible with the traction battery 104.

In addition to providing energy for propulsion, the traction battery 104 provides energy for other low voltage vehicle electrical systems, according to one or more embodiments. The vehicle 112 includes a DC/DC converter 128 that converts the high voltage DC output of the traction battery 104 and/or the power electronics controller 126 to a low voltage DC supply that is compatible with low voltage vehicle loads 129 and stored in a low-voltage auxiliary battery 130 (e.g., a 12V battery).

The traction battery 104 of the vehicle 112 may be recharged by an external power source 132 that is electrically coupled to an electric vehicle supply equipment (EVSE) 134, i.e., a charger or a charging station. The external power source 132 is an electrical power distribution network or grid as provided by an electric utility company, according to one or more embodiments. The EVSE 134 provides circuitry and controls to regulate and manage the transfer of energy between the external power source 132 and the vehicle 112. The external power source 132 provides DC or AC electric power to the EVSE 134. The EVSE 134 includes a charge connector 136 for plugging into a charge port 138 of the vehicle 112. The charge port 138 may be any type of port that is configured to transfer power from the EVSE 134 to the vehicle 112 and electrically coupled to an on-board power conversion controller 140 that conditions the power supplied from the EVSE 134 to provide the proper voltage and current levels to the traction battery 104. Additionally, or alternatively, the vehicle 112 may be configured to receive wireless power transfer via a wireless connection to the EVSE 134, such as, but not limited to, inductive charging over-the-air-gap (not shown).

One or more contactors 142 isolate the traction battery 104 from other components when opened and connect the traction battery 104 to other components when closed. While the contactor 142 is illustrated as a separate component, in some embodiments, the one or more contactors 142 may comprise a bussed electrical center (BEC) 144 that is configured to communicate with the battery controller 102 to allow the supply and withdrawal of electric energy to and from the traction battery 104. The battery controller 102 may issue a command to the BEC 144 to operate a plurality of switches, e.g., open or close contactors or relays, or otherwise manipulate one or more electrical components controlling transfer of energy to the traction battery 104, in response to one or more operating parameters associated with the traction battery 104 reaching a predefined threshold.

One or more high voltage electrical loads 146 are coupled to the high voltage bus, according to one or more embodiments. The high voltage electrical loads 146 may have an associated controller (not shown) that operates and controls the high voltage electrical loads 146 when appropriate. Examples of electrical loads 146 include a fan, an electric heating element and/or an air-conditioning compressor.

Electronic modules and controllers in the vehicle 112 communicate via one or more vehicle networks by wired or wireless communication, which is generally represented by signal lines in FIG. 1. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules and controllers.

The vehicle 112 also includes a system controller 148 to coordinate the operation of the various systems and components. The system controller 148, although represented as a single controller, may be implemented as one or more controllers. The system controller 148 monitors operating conditions of the traction battery 104, the power conversion controller 140 and the electric machine 114.

The battery controller 102 monitors the traction battery 104 in real-time by receiving signals that are indicative of the temperature, current, and voltage of the traction battery 104 and/or of its components, e.g., the battery cells 106. The battery controller 102 determines battery parameters, such as battery capacity and state of charge (SOC) in real-time and provides these electrical parameters to other vehicle controllers or systems that provide power to/from the traction battery 104, e.g., the system controller 148. For example, the system controller 148 may limit the amount of electrical power supplied to the electric machines 114, and/or restart the engine 118, when the SOC drops below a low SOC threshold. The system controller 148 may also stop charging the traction battery 104 when the SOC reaches a high SOC threshold (e.g., a maximum value of the SOC operating range).

The battery controller 102 may utilize various techniques to determine the SOC of the traction battery 104. For example, an ampere-hour integration may be implemented in which the current through the traction battery 104 is integrated over time. The SOC may also be estimated based on, for example, the output of a traction battery voltage sensor during open circuit conditions. The specific technique utilized is depend upon the chemical composition and characteristics of the particular battery. An SOC operating range may be defined for the traction battery 104. The operating ranges define an upper limit ($SOC_{max}$) and a lower limit ($SOC_{min}$) at which the SOC is bounded for the traction battery 104.

Referring to FIG. 2, the traction battery 104 is a battery pack made up of several battery modules 150, where each battery module 150 contains a plurality of battery cells 106. Each battery cell 106 includes a plurality of mono-cells 160; and each mono-cell includes a cathode electrode layer (cathode electrode) 162 and an anode electrode layer (anode electrode) 164, also referred to as positive and negative electrodes, respectively, that are separated by one or more separators 166. The separators 166 include an electrolyte and enable current flow (ion movement) between the cathode and anode electrodes 162, 164 of the mono-cells 160.

Each battery cell 106 includes a predefined number of mono-cells 160, e.g., twenty, that are connected together in series or in parallel. The battery cell 106 includes a positive terminal 170 that is connected with the cathode electrode 162 and a negative terminal 172 that is connected with the anode electrode 164. The mono-cells 160 and the battery cells 106 are electrochemical cells, capacitors, or other types of energy storage device implementations. The mono-cells 160 and the battery cells 106 are arranged in any suitable configuration and configured to receive and store electric energy for use in operation of the vehicle 112. While the traction battery 104 is described to include, electrochemical battery cells, other types of energy storage device implementations, such as capacitors, are also contemplated.

The battery cells 106 are arranged into one or more arrays, sections, or modules further connected in series or in parallel. This battery cell arrangement is referred to as a battery module 150, according to one or more embodiments. The battery module 150 includes a data connection 176 for communicating with the battery controller 102 (FIG. 1). The battery controller 102 and the BEC 144 are collectively referred to as a battery management system (BMS) 180. Additionally or alternatively, the data connection 176 includes one or more cell sensors in connection with one or more controllers of the vehicle 112, e.g., the battery controller 102. The cell sensors include one or more of temperature sensors, voltage sensors, current sensors, and so on.

The traction battery 104 includes one or more battery modules 150 that are connected together in series or in parallel. The BMS 180 monitors and manages, via the data connection 176, one or more of battery modules 150 and their sub-components. In one embodiment, the BMS 180 monitors the temperature, voltage, and/or current of the battery modules 150. In another embodiment, the BMS 180 monitors the temperature, voltage, and/or current of the mono-cells 160, the battery cells 106, the battery modules 150, and so on. The BMS 180 enables energy flow, to and from the traction battery 104, in response to a signal or a command from the BEC 144 and/or the battery controller 102.

Figure 3:
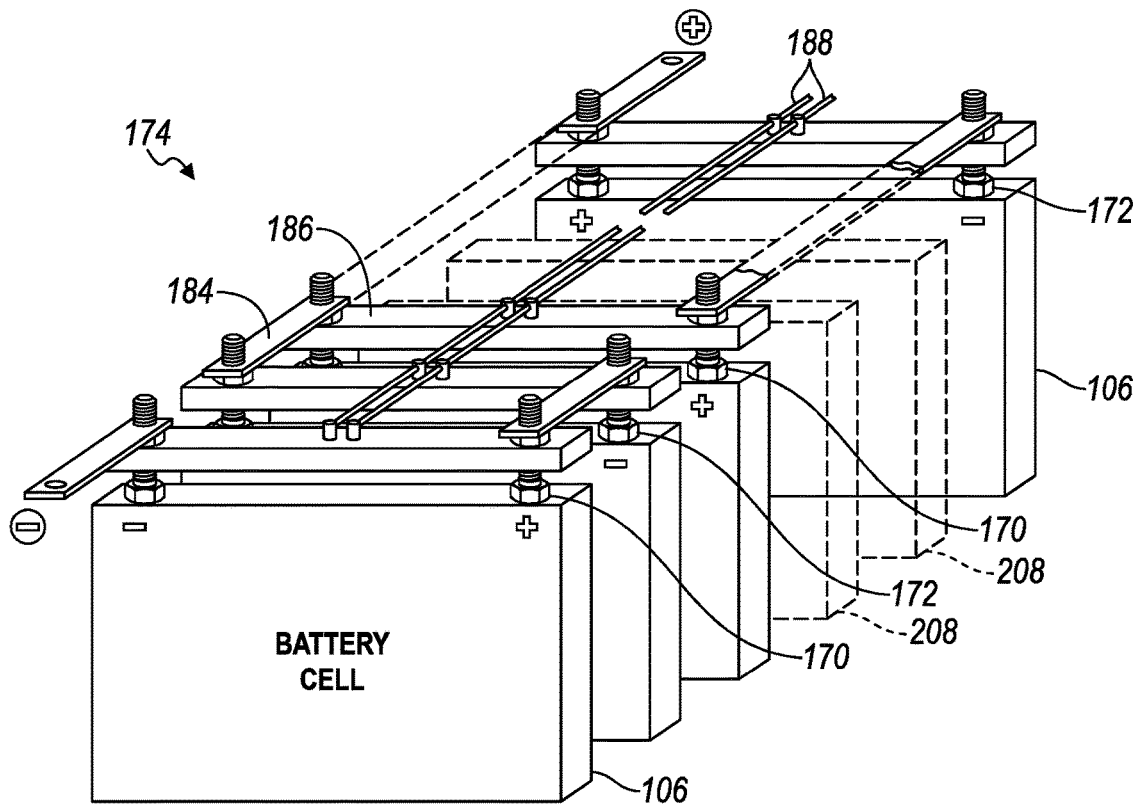
FIG. 3 is a block diagram illustrating connections between traction battery cells.

With reference to FIG. 3, each battery module 150 includes a plurality of the battery cells 106 that are connected in series, according to one or more embodiments. A plurality of busbars 184 each connect the positive terminal 170 of a given battery cell 106 with the negative terminal 172 of another, e.g., adjacent, battery cell 106, thereby providing a series connection between adjacent battery cells 106. A bypass bar 186 may be connected between the positive and negative terminals 170, 172 of the battery cell 106 to enable current to bypass a battery cell 106, such as when a fault was identified with that battery cell, identified by 208 in FIG. 3. The battery module 150 also includes a shared bus connection 188 that enables data collection from one or more of the battery cells 106.

Referring back to FIG. 2, when the BMS 180 detects a fault, the component experiencing diminished performance, e.g., a battery cell 106 or module 150 may be replaced, resulting in a mixed traction battery 204. In one embodiment, the vehicle system 100 is designed to accommodate individually replaceable battery cells 106. As illustrated in FIG. 2, the original battery cells are referenced by numeral 106, a battery cell having diminished performance 208 is removed and replaced by a new battery cell 206 resulting in a mixed battery module 250. In another embodiment, the vehicle system 100 is designed to accommodate individually replaceable battery modules 150. For example, if the BMS 180 detects a fault with one battery cell 106, it may be more efficient to replace the entire battery module 150 than to replace the individual battery cell having diminished performance 208. As illustrated in FIG. 2, the original battery modules are referenced by numeral 150, and the replacement modules are referenced by numeral 250, which results in a mixed traction battery 204.

Each cell 106 of the traction battery is designed to provide the same nominal voltage and capacity, according to one or more embodiments. However, new battery cells 206 have different performance characteristics than the original battery cells 106 due to, among other things, battery aging. Similarly, new battery modules 250 have different performance characteristics than the original battery modules 150.

The following equation represents an example of the relationship between the capacity of similar battery cells 106 (i.e., cells that are designed to meet the same specifications) of different ages:

$$CAP_{new\_repl} = CAP_{new\_orig} > CAP_{orig} \qquad (1)$$

Where $CAP_{new\_repl}$ represents the capacity of a new replacement battery cell 206 in ampere-hours; $CAP_{new\_orig}$ represents the capacity of an original battery cell 106 when it was new (i.e., prior to use) and equal to the new replacement battery cell 206; and $CAP_{orig}$ represents the present capacity of an original battery cell 106, i.e., after it has aged, which is less than the capacity of a new battery cell, e.g., a new original battery cell or a new replacement battery cell.

As illustrated by equation 1, the capacity of the new replacement battery cells 206 is greater than the present capacity of the original battery cells 106 (i.e., $CAP_{new\_repl} > CAP_{orig}$). Since the new replacement battery cells 206 have higher capacity than the original battery cells 106, the new replacement battery cells 206 are more capable in terms of delivering power and energy when compared to the original battery cells 106. Therefore, a new replacement battery cell 206 can provide the same amount of power as an original cell 106 at a lower SOC.

Accordingly, the battery controller 102 determines the SOC of the battery cells 106 separately based on the age of the cells, e.g., whether the cell is an original battery cell 106 or a replacement battery cell 206. In one or more embodiments, the battery controller 102 calculates SOC using the ampere*hour integration based method using the battery capacity for the corresponding age of the cell, i.e., $CAP_{new\_orig}$ or $CAP_{orig}$. Similarly, the battery controller 102 balances the original battery cells 106 and the new replacement battery cells 206 separately.

The following equation represents the ampere*hour integration based equation:

$$SOC(t) = SOC_{t_0} - \frac{\int_{t_0}^{t} i\,dt}{C} \times 100 \quad (2)$$

Where SOC(t) represents the cell SOC at the current time t; $t_0$ represents the initial time; $SOC_{t_0}$ represents the initial SOC of the cell at time $t_0$; i represents the battery current measured by the current sensor, where discharge current is positive value and charge current is negative value; and C represents cell capacity.

Figure 4:
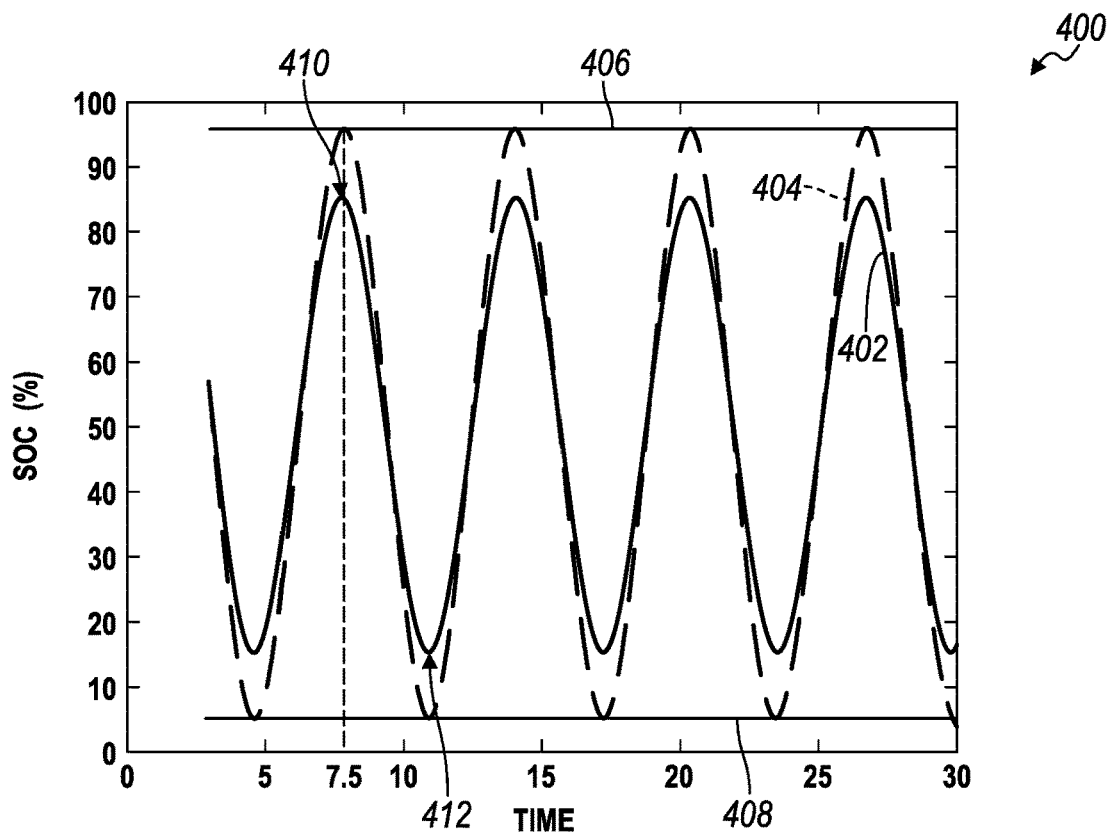
FIG. 4 is a graph illustrating the relationship between the SOC of a new battery cell and the SOC of an original battery cell over time.

FIG. 4 is a graph 400 that illustrates an example of the relationship between the SOC of a new battery cell 206 (shown in solid line 402) and an original battery cell 106 (shown in dashed line 404) over time. Battery cells 106 are controlled to operate within a predetermined SOC window to avoid issues due to overcharge or over discharge. The original battery cell 106 illustrated in graph 400 is controlled to operate within approximately 90% of its SOC, i.e., between a maximum SOC of 95%, which is referenced by numeral 406, and a minimum SOC of 5%, which is referenced by numeral 408. However, due to its higher capacity, a new replacement battery cell 206 can achieve similar performance in terms of delivering power and energy as the original battery cell 106 at a narrower SOC range of approximately 70%, i.e., between a maximum SOC of approximately 85%, and a minimum SOC of approximately 15%.

The battery controller 102 controls the mixed traction battery 204 such that the original battery cells 106 are operated to their full capacity, i.e., throughout their present full SOC operating range, while maintaining the power and energy of the mixed traction battery 204 to that of the original traction battery prior to cell replacement.

The battery controller 102 determines the adjusted SOC of the new replacement cells ($SOC_{new\_repl\_adj}$), after they are installed in the vehicle, based on the SOC and capacity of the original battery cells according to the following equation:

$$SOC_{new\_repl\_adj} = SOC_{max}(CAP_{orig}) + \frac{[SOC_{orig} - SOC_{max}(CAP_{orig})]CAP_{orig}}{CAP_{new\_repl}} \quad (3)$$

Where $SOC_{max}(CAP_{orig})$ represents the upper boundary of the original battery SOC operating window at battery capacity; $SOC_{orig}$ represents the present SOC of the original battery cells 106; $CAP_{orig}$ represents the present capacity of an original battery cell 106, i.e., after it has aged; and $CAP_{new\_repl}$ represents the capacity of a new replacement battery cell 206.

Figure 5:
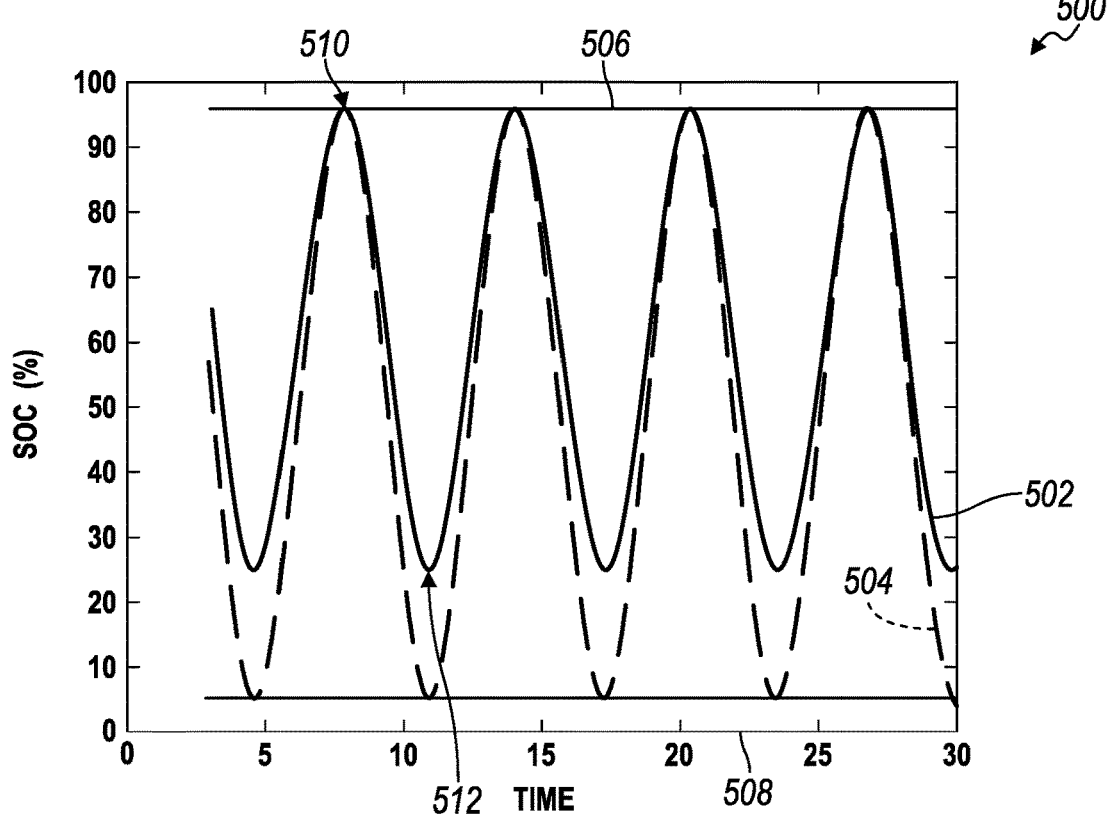
FIG. 5 is a is a graph illustrating the relationship between an adjusted SOC of the new battery cell and the SOC of the original battery cell over time.

With reference to FIGS. 4 and 5, the battery controller 102 determines the adjusted SOC of a new replacement battery cell 206 for a mixed traction battery 204 that includes original battery cells 106 and replacement battery cells 206 having values as shown in the graph 400 of FIG. 4. FIG. 5 is a graph 500 that illustrates an example of the adjusted SOC operating range for the new replacement battery cell 206 (shown in solid line 502) and the SOC of the original battery cell 106 (shown in dashed line 504) over time.

At time 7.5 s, the battery controller 102 determines the maximum adjusted SOC for the new replacement battery cell 206 to be 95% (referenced by numeral 510) based on a $SOC_{max}(CAP_{orig})$ of 95%, an $SOC_{orig}$ of 95%, a $CAP_{orig}$ of 75 amp-hours and a $CAP_{new\_repl}$ of 100 amp-hours using equation 3 as shown below:

$$SOC_{new\_repl\_adj\_max} = 0.95 + \frac{[0.95 - 0.95]75}{100} = 0.95$$

At time 11.0 s, the battery controller 102 determines the minimum adjusted SOC for the new replacement battery cell 206 to be 24% (referenced by numeral 512) based on a $SOC_{max}(CAP_{orig})$ of 95%, an $SOC_{orig}$ of 5%, a $CAP_{orig}$ of 75 amp-hours and a $CAP_{new\_repl}$ of 95 amp-hours using equation 3 as shown below:

$$SOC_{new\_repl\_adj\_min} = 0.95 + \frac{[0.05 - 0.95]75}{95} = 0.95 + (-0.71) = 0.24$$

As illustrated by comparing the SOC curves from graph 500 to those in graph 400, the battery controller 102 adjusts the SOC operating range of the new replacement battery cells 206 to operate at the upper limit of the original battery cell SOC operating range. The charging power limit corresponds to $SOC_{max}$ and is dominated by the SOC of the new replacement battery cells. Additionally, the discharge power limit and discharge energy, which correspond to $SOC_{min}$, are dominated by the SOC of the original aged battery cells. This approach maximizes the discharge energy of the mixed traction battery 204, which extends the electric vehicle (EV) range of the vehicle 112. By adjusting the SOC of new replacement battery cells 206, the battery controller 102 may utilize existing battery overcharge and over-discharge protection strategies. The above calculations illustrate an example of how the battery controller 102 determines the maximum adjusted SOC for the new replacement battery cell at time 7.5 s (compare 410 to 510) and the minimum adjusted SOC for the new replacement battery cell at time 11.0 s (compare 412 to 512).

The controller 102 controls the mixed traction battery 204 to perform like a traction battery 104 having battery cells 106 with the same performance characteristics, which allows the original battery cells 106 to operate through their full SOC operating range; and allows the mixed traction battery 204 to perform, in terms of power and energy, at least as well as an aged original traction battery 104 without any faults.

Figure 6:
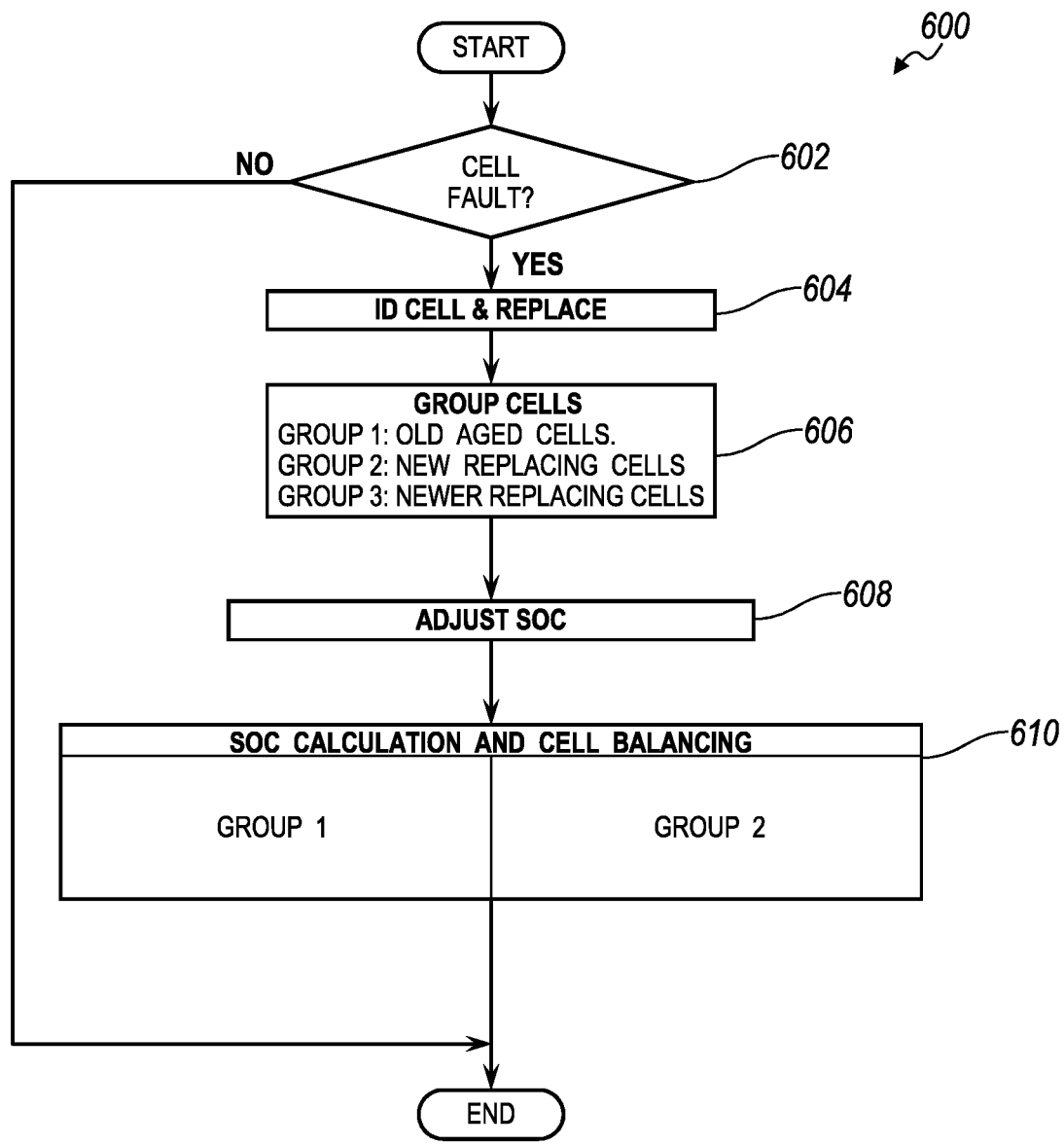
FIG. 6 is a flow chart illustrating a method for controlling a mixed traction battery according to one or more embodiments.

With reference to FIG. 6, a method for controlling a mixed traction battery 204 is illustrated in accordance with one or more embodiments and generally referenced by numeral 600. The method 600 is implemented as an algorithm using software code contained within the battery controller 102. In other embodiments, the method is distributed among multiple controllers, e.g., the battery controller 102 and the system controller 148. The battery controller 102 generally includes any number of microprocessors, ASICs, ICs, memory (e.g., FLASH, ROM, RAM, EPROM and/or EEPROM) and software code to co-act with one another to perform a series of operations. The battery controller 102 also includes predetermined data, or "look up tables" that are based on calculations and test data and stored within the memory.

At operation 602, if the battery controller 102 detects a battery cell fault, it proceeds to operation 604 and identifies battery cells having diminished performance 208 to replace. Then these battery cells 208 are replaced with new replacement battery cells 206, e.g., by a service technician at a dealership. In one or more embodiments, the service technician provides information indicative of the characteristics of the replacement battery cells 206 to the battery controller 102 during the replacement procedure. At operation 606, the battery controller 102 groups the battery cells 106, 206 by age based on the new replacement battery cell information, e.g., Group 1 includes the original battery cells 106, and Group 2 includes the new replacement battery cells 206. Although described with reference to two groups, the method may be repeated for additional battery cell replacements, e.g., Group 3 "Newer Replacement Cells."

At operation 608, the battery controller 102 determines the SOC adjustment value for the new replacement battery cells 206 using Equation 3 as described above. Then at operation 610 the battery controller 102 calculates the SOC for each Group of battery cells separately, using the appropriate equation and capacity value, and then balances the battery cells in each Group separately. In one embodiment, the battery controller 102 calculates the SOC for the new replacement battery cells 206 using the ampere*hour integration method (Equation 2) using the SOC adjustment value as the initial SOC value ($SOC_{t0}$).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a battery with a first cell and a second cell; and
   a controller configured to:
   determine a first state of charge (SOC) associated with the first cell and a first SOC operating range based on the first SOC over time, wherein a maximum value of the first SOC operating range corresponds to a first capacity of the first cell;
   responsive to indication that the second cell has been replaced by a new cell having a second capacity that is greater than the first capacity, determine an SOC adjustment value;
   determine a second SOC associated with the new cell and a second operating range based on the second SOC over time, wherein the second SOC is based on the SOC adjustment value, and wherein a maximum value of the second SOC operating range is equal to the maximum value of the first SOC operating range; and
   balance the first cell and the new cell separately,
   wherein the controller is further configured to determine the SOC adjustment value based on the first SOC, the maximum value of the first SOC operating range, the first capacity, and the second capacity,
   wherein the controller is further configured to calculate the SOC adjustment value according to:

$$SOC_{new\_repl\_adj} = SOC_{max}(CAP_{orig}) + \frac{[SOC_{orig} - SOC_{max}(CAP_{orig})]CAP_{orig}}{CAP_{new\_repl}},$$

and wherein $SOC_{max}(CAP_{orig})$ represents the maximum value of the first SOC operating range, $SOC_{orig}$ represents the first SOC, $CAP_{orig}$ represents the first capacity, and $CAP_{new\_repl}$ represents the second capacity.

2. The vehicle of claim 1 wherein the controller is further configured to:
   generate output indicative of a battery SOC based on the first SOC and the second SOC; and
   stop charging the battery in response to the battery SOC exceeding the maximum value of the first SOC operating range.

3. The vehicle of claim 1 wherein the controller is further configured to determine the first SOC of the first cell in real-time based the first capacity and first information indicative of present first cell battery characteristics.

4. The vehicle of claim 1 wherein the controller is further configured to determine the second SOC of the new cell in real-time based on the second capacity and second information indicative of present new cell battery characteristics.

5. The vehicle of claim 1 further comprising a third cell, and wherein the controller is further configured to:
   responsive to the third cell being replaced by a newer cell having a third capacity that is greater than the first capacity, determine a third SOC adjustment value; and
   determine a third SOC associated with the newer cell and a third operating range based on the third SOC over time, wherein the third SOC is based on the third SOC adjustment value, and wherein a maximum value of the third SOC operating range is equal to the maximum value of the first SOC operating range.

6. A vehicle system comprising:
   a battery with a first module, having a first capacity, and a second module connected in series; and
   a controller programmed to:
   responsive to indication that the second module has been replaced by a new module with a second capacity that is greater than the first capacity for a corresponding state of charge (SOC), charge and discharge the battery such that the first module is operated within a first window defined by first maximum and minimum voltages, and the second module is operated within a second window defined by second maximum and minimum voltages, wherein the second minimum voltage is at least partially defined by the first maximum and minimum voltages, and wherein the second window is smaller than the first window; and
   balance the first module and the new module separately.

7. The vehicle system of claim 6 wherein the first module comprises at least two original cells, and the new module comprises at least two replacement cells.

8. The vehicle system of claim 6 wherein the second minimum voltage is at least partially defined by a difference between the first maximum and minimum voltages.

9. The vehicle system of claim 6 wherein the second minimum voltage is at least partially defined by amp-hour capacities of the first and second modules.

10. The vehicle system of claim 6 wherein the second minimum voltage is at least partially defined by a quotient of the amp-hour capacities.

11. The vehicle system of claim 6 wherein the second maximum and minimum voltages are contained within the first window.

* * * * *